(12) United States Patent
Wang et al.

(10) Patent No.: US 11,987,316 B2
(45) Date of Patent: May 21, 2024

(54) ELECTRIC SCOOTER

(71) Applicant: NINEBOT (BEIJING) TECH CO., LTD., Beijing (CN)

(72) Inventors: Tong Wang, Beijing (CN); Wei Li, Beijing (CN); Anqi Sun, Beijing (CN); Ling Zhang, Beijing (CN)

(73) Assignee: NINEBOT (BEIJING) TECH CO., LTD., Beijing (CN)

( * ) Notice: Subject to any disclaimer, the term of this patent is extended or adjusted under 35 U.S.C. 154(b) by 318 days.

(21) Appl. No.: 17/565,933

(22) Filed: Dec. 30, 2021

(65) Prior Publication Data

US 2022/0204113 A1    Jun. 30, 2022

(30) Foreign Application Priority Data

Dec. 31, 2020  (CN) .......................... 202023341057.8

(51) Int. Cl.
*B62K 3/00* (2006.01)
*B60K 7/00* (2006.01)
*B62K 15/00* (2006.01)

(52) U.S. Cl.
CPC ............ *B62K 3/002* (2013.01); *B60K 7/0007* (2013.01); *B62K 15/006* (2013.01); *A63C 2203/12* (2013.01); *B62K 2204/00* (2013.01)

(58) Field of Classification Search
CPC .... B62K 3/002; B60K 7/0007; A63C 2203/12
See application file for complete search history.

(56) References Cited

U.S. PATENT DOCUMENTS

| | | | | |
|---|---|---|---|---|
| 5,036,938 A * | 8/1991 | Blount | ................... | B62D 61/08 180/68.5 |
| 7,234,557 B2 * | 6/2007 | Chen | ..................... | B62K 15/00 280/638 |
| 8,720,918 B2 * | 5/2014 | Liao | ..................... | B62K 15/006 280/87.041 |
| 9,174,692 B2 * | 11/2015 | Treadway | .............. | B62K 5/027 |
| 9,795,864 B1 * | 10/2017 | Bao | ......................... | B60L 15/00 |
| 10,245,936 B2 | 4/2019 | Gillett | | |
| 10,384,556 B1 * | 8/2019 | Miyata | ................ | H01M 50/249 |
| 11,697,469 B2 * | 7/2023 | Desberg | ................... | B62L 1/00 180/206.3 |

(Continued)

FOREIGN PATENT DOCUMENTS

CN    205769825 U    12/2016
CN    106627898 A    5/2017
(Continued)

*Primary Examiner* — Erez Gurari
(74) *Attorney, Agent, or Firm* — Frost Brown Todd LLP

(57) ABSTRACT

An electric scooter includes a deck, a power wheel unit, a power wheel steering unit, a driven wheel, a driven wheel steering unit, a power supply unit and a whole scooter controller. The power wheel unit includes a driving wheel; the power wheel steering unit is arranged between the deck and the power wheel unit; the driven wheel is spaced apart from the power wheel unit; the driven wheel steering unit is arranged between the driven wheel and the deck; the power supply unit is electrically coupled to the power wheel unit; the whole scooter controller is in communication with the power wheel unit and controls rotation of the driving wheel.

20 Claims, 7 Drawing Sheets

(56) References Cited

U.S. PATENT DOCUMENTS

| | | | | |
|---|---|---|---|---|
| 11,697,470 | B1* | 7/2023 | Wang | A63C 17/0093 |
| | | | | 180/220 |
| 2004/0016582 | A1* | 1/2004 | Ho | B62M 7/08 |
| | | | | 180/181 |
| 2004/0079571 | A1* | 4/2004 | Laver | B62M 6/60 |
| | | | | 180/180 |
| 2006/0266570 | A1 | 11/2006 | Roth et al. | |
| 2007/0187164 | A1* | 8/2007 | Yang | B62K 3/002 |
| | | | | 180/209 |
| 2013/0186702 | A1* | 7/2013 | Hadley | B62K 3/002 |
| | | | | 188/74 |
| 2016/0297459 | A1* | 10/2016 | Opsvik | B62B 1/12 |
| 2016/0318572 | A1* | 11/2016 | Oh | B62K 21/16 |
| 2019/0263468 | A1* | 8/2019 | Huang | B62J 43/13 |
| 2020/0346100 | A1* | 11/2020 | Liniado | A63C 17/014 |
| 2020/0354008 | A1* | 11/2020 | Wang | B62J 43/16 |
| 2022/0241676 | A1* | 8/2022 | King | A63C 17/002 |
| 2023/0348010 | A1* | 11/2023 | Klier | B62K 3/002 |

FOREIGN PATENT DOCUMENTS

| | | |
|---|---|---|
| CN | 206654137 U | 11/2017 |
| CN | 207477937 U | 6/2018 |
| CN | 109533152 A | 3/2019 |
| CN | 109987184 A | 7/2019 |
| CN | 110510041 A | 11/2019 |
| CN | 111770875 A | 10/2020 |
| CN | 211630859 U | 10/2020 |
| CN | 214138807 U | 9/2021 |

* cited by examiner

ELECTRIC SCOOTER

CROSS-REFERENCE TO RELATED APPLICATION

This application claims priority to and benefits of Chinese Patent Application Serial No. 202023341057.8, filed with China National Intellectual Property Administration on Dec. 31, 2020, the entire content of which is incorporated herein by reference.

FIELD

The present disclosure relates to the field of scooter technologies, and more particularly, to an electric scooter.

BACKGROUND

An electric scooter is a kind of electrically driven transportation tool. Two wheels of the electric scooter are generally provided along a front-rear direction of riding. One of the two wheels is a power wheel and the other of the two wheels is a driven wheel. A user directly operates the rotation of the power wheel through a handlebar, and the user controls the steering of the power wheel by operating handlebar.

SUMMARY

An electric scooter according to embodiments of the present disclosure includes: a deck, a power wheel unit, a power wheel steering unit, a driven wheel, a driven wheel steering unit, a power supply unit and a whole scooter controller. The power wheel unit includes a driving wheel; the power wheel steering unit is arranged between the deck and the power wheel unit; the driven wheel is spaced apart from the power wheel unit; the driven wheel steering unit is arranged between the driven wheel and the deck; the power supply unit is electrically coupled to the power wheel unit; the whole scooter controller is in communication with the power wheel unit; the whole scooter controller controls rotation of the driving wheel. The power wheel unit is detachably coupled to the power wheel steering unit.

BRIEF DESCRIPTION OF THE DRAWINGS

The above and/or additional aspects and advantages of the present disclosure will become apparent and easy to understand from following descriptions of embodiments in combination with accompanying drawings, in which.

Figure 1:
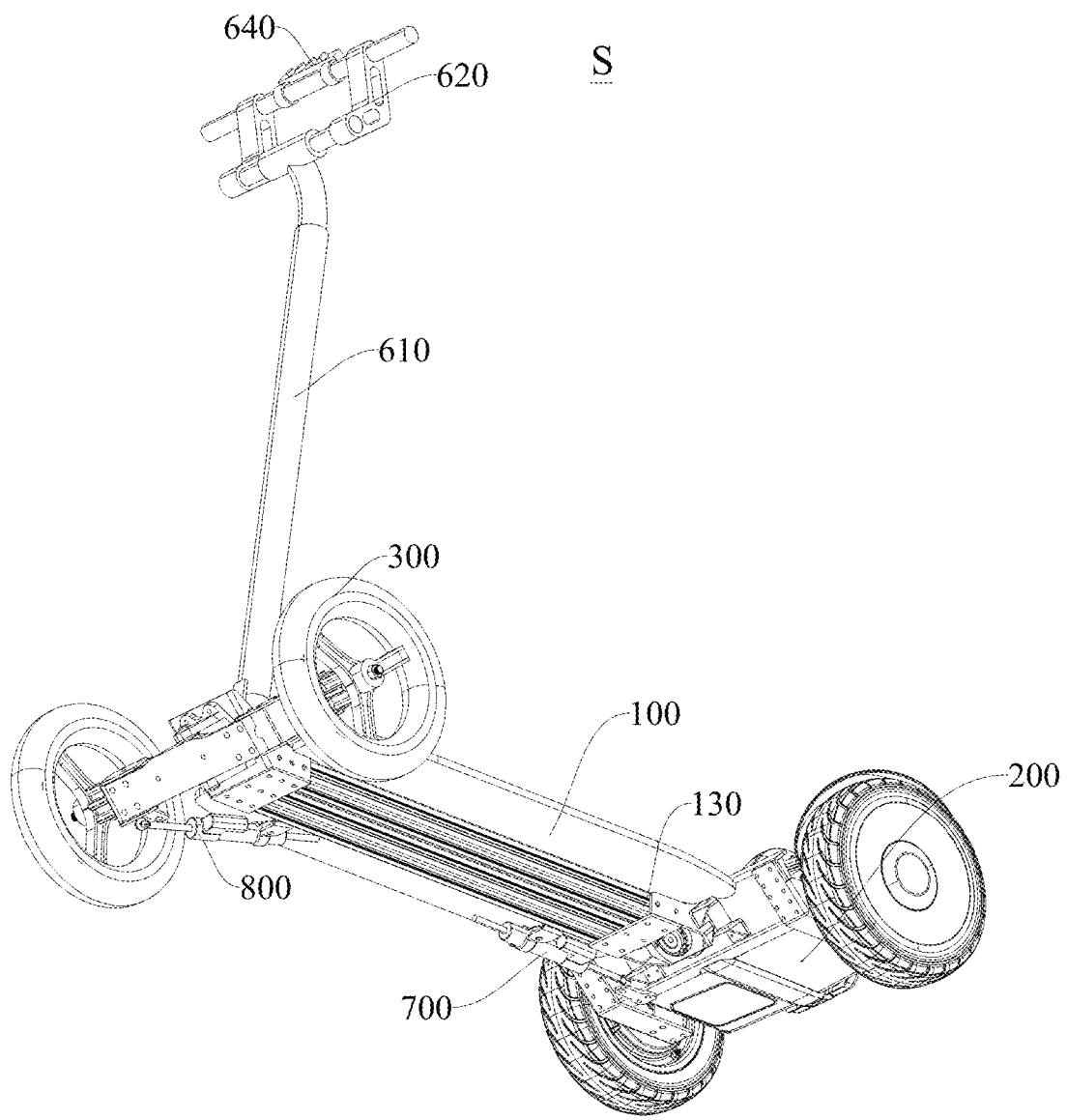
FIG. 1 is a schematic view of an electric scooter according to an embodiment of the present disclosure.

REFERENCE NUMERALS electric scooter S;
deck 100; first avoidance groove 110; second avoidance groove 120; projecting block 130; power wheel unit 200; chassis 210; driving wheel 220;
driven wheel 300;
power wheel steering unit 400;
the first steering frame 410; first steering plate 411; first flanging plate 412; second flanging plate 413; first reinforcing plate 414;
the second steering frame 420; second steering plate 421; first fixing frame 422; first fixing plate 4221; second fixing plate 4222; fourth coupling plate 423;
first steering assembly 430; first steering shaft 431; first base 4311; first shaft 4312; limit hole 4313; steering bearing 432; inner ring 4321; outer ring 4322; rolling member 4323; first limit member 433; pressure needle bearing 434;
first mounting frame 440; first mounting plate 441; first coupling plate 442; second mounting plate 443; second coupling plate 444; third coupling plate 445;
first buffer 450; second buffer 460;
driven wheel steering unit 500; the third steering frame 510; the fourth steering frame 520; second steering shaft 530; second mounting frame 540;
handlebar assembly 600; pole 610; the first pole segment 611; second pole segment 612; second limit member 613; handle 620; the first handlebar 621; second handlebar 622; coupling lever 623; first bending portion 6231; second bending portion 6232; second base 630; whole scooter controller 640;
first damping device 700; the second damping device 800.

DETAILED DESCRIPTION

Embodiments of the present disclosure are described in detail below. The embodiments described with reference to accompanying drawings are exemplary. The embodiments of the present disclosure are described in detail below.

In the related art, the steering operation is inconvenient, so that the driving experience of the electric scooter is poor. The present disclosure aims to solve at least one of the technical problems existing in the related art. To this end, an object of the present disclosure is to provide an electric scooter, which uses a power wheel unit as a power source, and whose steering can be effectively controlled by a whole scooter controller. Thus, the steering operation of the electric scooter is easy and the driving experience thereof is good.

An electric scooter according to embodiments of the present disclosure includes: a deck, a power wheel unit, a power wheel steering unit, a driven wheel, a driven wheel steering unit, a power supply unit and a whole scooter controller. The power wheel unit includes a driving wheel; the power wheel steering unit is arranged between the deck and the power wheel unit; the driven wheel is spaced apart from the power wheel unit; the driven wheel steering unit is arranged between the driven wheel and the deck; the power supply unit is electrically coupled to the power wheel unit; the whole scooter controller is in communication with the power wheel unit; the whole scooter controller controls rotation of the driving wheel.

The electric scooter according to the embodiments of the present disclosure uses the power wheel unit as the power source, and the whole scooter controller can effectively control the steering of the electric scooter. The steering operation of the electric scooter is easy and the driving experience thereof is good.

According to some embodiments of the present disclosure, the power wheel unit is detachably coupled to the power wheel steering unit; the power supply unit is arranged in the power wheel unit.

According to some embodiments of the present disclosure, the driving wheel includes a wheel body and a hub motor, the wheel body is rotatably arranged on the deck, and the hub motor is arranged in the wheel body and electrically coupled to the power supply unit.

According to some embodiments of the present disclosure, the power wheel unit includes a unit controller, the whole scooter controller is in communication with the unit controller when the power wheel unit is mounted on the deck, and the unit controller obtains operation information transmitted from the whole scooter controller to control rotation of the power wheel.

According to some embodiments of the present disclosure, the power wheel unit is a self-balancing scooter and further includes a chassis and a sensor. Two driving wheels are provided and arranged at two sides of the chassis. The chassis is configured to bear a load, and the unit controller is configured to obtain posture information of the load detected by the sensor and control independent rotation of the two driving wheels when the power wheel unit operates as the self-balancing scooter. Or, one driving wheel is provided and pivotally coupled to the chassis. The chassis is configured to bear the load, and the unit controller is configured to obtain the posture information of the load detected by the sensor and control the independent rotation of the driving wheel when the power wheel unit operates as the self-balancing scooter.

According to some embodiments of the present disclosure, the power wheel steering unit includes: a first steering frame, a second steering frame, a first steering assembly. The first steering frame is arranged on the power wheel unit; the second steering frame is arranged at a first end of the deck; the first steering assembly is arranged between the first steering frame and the second steering frame and allows relative rotation between the first steering frame and the second steering frame.

According to some embodiments of the present disclosure, the first steering assembly includes: a first steering shaft and a steering bearing. The first steering shaft is arranged on the first steering frame; the steering bearing includes an inner ring, an outer ring, a holding frame and a rolling member. The rolling member is arranged in the holding frame arranged between the inner ring and the outer ring. The first steering shaft is arranged on the inner ring and rotates synchronously with the inner ring, and the outer ring is arranged on the second steering frame and fixed with the second steering frame.

According to some embodiments of the present disclosure, the power wheel steering unit further includes: a first mounting frame arranged between the first steering frame and the power wheel unit.

According to some embodiments of the present disclosure, the power wheel steering unit further includes: a first buffer arranged between the first steering frame and the second steering frame.

According to some embodiments of the present disclosure, the electric scooter further includes a first damping device arranged between the deck and the first steering frame.

According to some embodiments of the present disclosure, two driven wheels are provided; the driven wheel steering unit includes: a third steering frame, a fourth steering frame and a second steering shaft. The two driven wheels are arranged on two sides of the third steering frame respectively; the fourth steering frame is arranged at a second end of the deck; the second steering shaft passes through the third steering frame and the fourth steering frame and arranged obliquely relative to the deck.

According to some embodiments of the present disclosure, the driven wheel steering unit further includes: a second buffer arranged between the third steering frame and the fourth steering frame.

According to some embodiments of the present disclosure, the electric scooter further includes: a second damping device arranged between the deck and the third steering frame or between the deck and the driven wheel.

An electric scooter S according to the embodiments of the present disclosure is described below with reference to FIGS. 1 to 8.

As illustrated in FIG. 1, the electric scooter S according to the embodiments of the present disclosure includes a deck 100, a power wheel unit 200, a power wheel steering unit 400, a driven wheel 300, a driven wheel steering unit 500, a power supply unit 900 and a whole scooter controller 640.

The power wheel unit 200 can be detachably arranged on the deck 100, such as a bottom of the deck 100, the power wheel unit 200 includes a driving wheel 220, and the driving wheel 200 can provide power to the electric scooter S. That is, the electric scooter S of the present disclosure provides a driving force to the electric scooter S through the power wheel unit 200, thus the electric scooter S does not need to be configured with a driving wheel assembly separately. Since the power wheel unit 200 adopts a detachable mounting mode, a user can be provided with a variety of travel options. For example, the user can mount the power wheel unit 200 on the deck 100, so that the user can travel by the electric scooter S. In another example, the user can disassemble the power wheel unit 200 and use it alone, so that the user can travel by the power wheel unit 200. Thus the user's travel choices are effectively enriched and it facilitates the user to select an appropriate travel mode according to a specific travel scenario.

Figure 7:
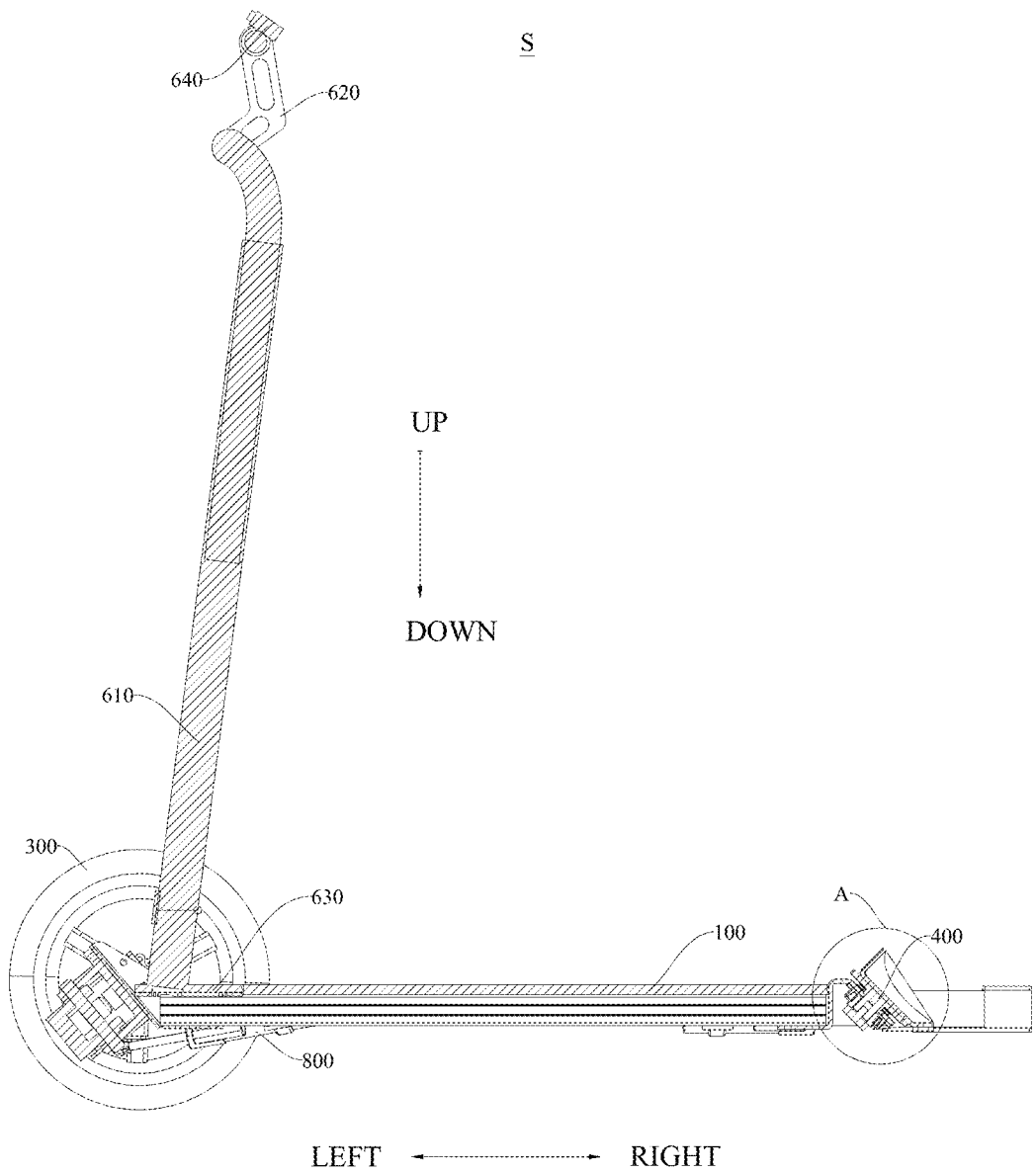
FIG. 7 is a sectional view of an electric scooter according to an embodiment of the present disclosure.
Figure 8:
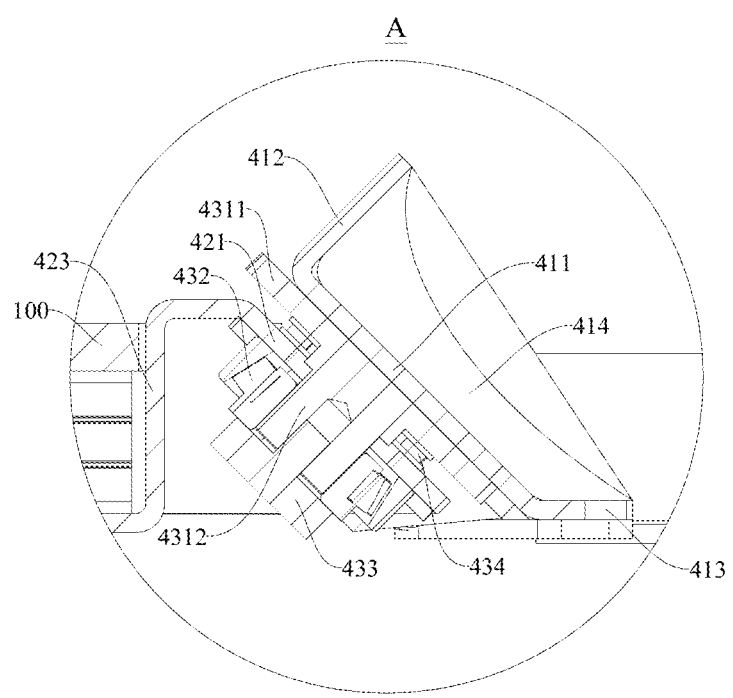
FIG. 8 is a partially enlarged view of part A in FIG. 7.

As illustrated in FIGS. 1 and 7, the power wheel unit 200 is coupled to the power wheel steering unit 400 in a detachable coupling mode. The driven wheel 300 is spaced apart from the power wheel unit 200 and coupled to the driven wheel steering unit 500, and the power wheel steering unit 400 and the driven wheel steering unit 500 are both arranged on the deck 100. With this arrangement, the driven wheel 300 and the power wheel unit 200 work together, so that the deck 100 and the user located on the deck 100 can be effectively supported. Moreover, the driven wheel 300 moves with the power wheel unit 200, when the power wheel unit 200 provides the driving force. The user can steer the electric scooter S by stepping on the deck 100, when the electric scooter S needs to be steered. In this process, the driven wheel steering unit 500 can control the steering of the driven wheel 300, and the power wheel steering unit 400 can control the steering of the power wheel unit 200. Therefore, by providing the driven wheel steering unit 500 and the power wheel steering unit 400, the steering of the electric scooter S can be convenient and the driving experience of the user can be improved.

The electric scooter S is provided with a power supply unit 900, and the power supply unit 900 is electrically coupled to the power wheel unit 200. Power can be supplied to the power wheel unit 200 through the power supply unit 900, to drive the power wheel unit 200 to rotate.

In addition, the electric scooter S is also provided with a whole scooter controller 640 in communication with the power wheel unit 200, and the whole scooter controller 640 controls rotation of the driving wheel 220. That is, the whole scooter controller 640 can control the driving of the electric scooter S. Different from a traditional electric scooter, the electric scooter S of the present disclosure can control the power wheel unit 200 through the whole scooter controller 640. Thus, the operation of the electric scooter S can be simple and convenient and the user experience is improved.

In addition, the electric scooter S with this arrangement can also facilitate the storage of the electric scooter S at least to a certain extent. For example, in a scene with large space, the user can store the electric scooter S as a whole. In another example, in a scene with small space, the user can disassemble the deck 100 and power wheel unit 200 of the electric scooter S and store them separately. Thus the space can be used rationally and the storage of the electric scooter S can be further facilitated, especially suitable for a situation when boot space of a vehicle of the user is insufficient.

As illustrated in FIG. 1, the power wheel unit 200 is detachably arranged at a first end of the deck 100, i.e., the power wheel unit 200 is arranged to the power wheel steering unit 400, and the power wheel steering unit 400 is arranged at the first end of the deck 100. The driven wheel 300 is arranged at a second end of the deck 100, i.e., the driven wheel 300 is arranged at the second end of the deck 100 through the driven wheel steering unit 500. Since the power wheel unit 200 and the driven wheel 300 are arranged at two ends of the deck 100 respectively, the stability of the electric scooter S is guaranteed and the electric scooter S is prevented from tipping over when driving or parking. For example, the power wheel unit 200 can be arranged at a front end of the deck 100, and the driven wheel 300 can be arranged at a rear end of the deck 100, so that the power wheel unit 200 can be used as a front driving wheel assembly. In another example, as illustrated in FIG. 1, the power wheel unit 200 can be arranged at the rear end of the deck 100, and the driven wheel 300 can be arranged at the front end of the deck 100, so that the power wheel unit 200 can be used as a rear driving wheel assembly.

Therefore, in the electric scooter S of the present disclosure, the power wheel unit 200 is used as a detachable power wheel unit of the electric scooter S, thus improving the storage of the electric scooter S. Moreover, compared with an existing electric scooter, the electric scooter S of the present disclosure has a larger wheel diameter and a larger wheel width, thus improving the trafficability and site adaptability of the electric scooter S, and can be used under most site conditions.

According to an embodiment of the present disclosure, the power wheel unit 200 is detachably coupled to the power wheel steering unit 400, and the power supply unit 900 is arranged in the power wheel unit 200. That is, the power wheel unit 200 can be removed from the power wheel steering unit 400. With this arrangement, when using the electric scooter S, the power wheel steering unit 400 can be mounted on the power wheel unit 200, so that other power wheel units (such as a self-balancing scooter) can be refitted to the electric scooter S, thus improving the driving stability of the electric scooter S.

In addition, the power supply unit 900 is arranged in the power wheel unit 200 to avoid using too many wires to couple the power wheel unit 200 and the power supply unit 900, and, the normal use of the power wheel unit 200 will be not affected when removing the power wheel steering unit 400. Moreover, the power wheel unit 200 with this arrangement has a high degree of integration and can reduce a volume of the electric scooter S.

In some embodiments, the driving wheel 220 includes a wheel body 222 and a hub motor 224. The wheel body 222 is rotatably arranged on the power wheel steering unit 400, and the hub motor is arranged in the wheel body 222 and electrically coupled to the power supply unit 900. The driving wheel 220 with this arrangement has a reliable structure and a good dynamic performance.

The power wheel unit 200 includes a unit controller 250. The whole scooter controller 640 is in communication with the unit controller 250 when the power wheel unit 200 is mounted on the power wheel steering unit 400. The unit controller 250 obtains operation information transmitted from the whole scooter controller 640 and controls rotation of the power wheel 220. That is, a unit controller 250 is also arranged in the power wheel unit 20, and the unit controller 250 is in communication with the whole scooter controller 640. The whole scooter controller 640 can control a driving parameter of the electric scooter S, and the unit controller 250 can control a driving parameter of the power wheel unit 200. When only the power wheel unit 200 needs to be used, the driving of the power wheel unit 200 is controlled by the unit controller 250; when the electric scooter S needs to be used, the driving of the electric scooter S is controlled by the whole scooter controller 640. Therefore, the user can control the electric scooter S and the power wheel unit 200 respectively.

Figure 5:
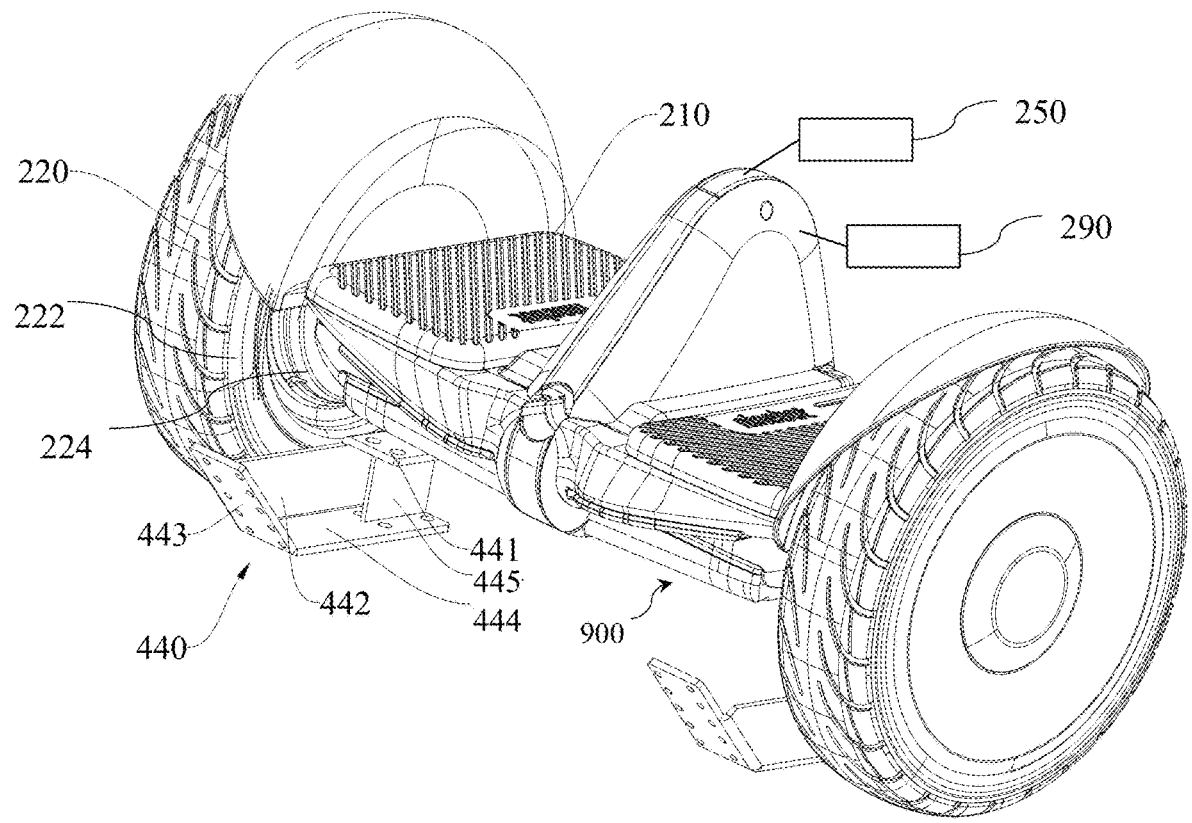
FIG. 5 is a schematic view of a coupling structure between a power wheel unit and a first mounting frame.

According to an embodiment of the present disclosure, as illustrated in FIG. 5, the power wheel unit 200 is a self-balancing scooter. The power wheel unit 200 further includes a chassis 210 and a sensor 290, two driving wheels 220 are provided, and the two driving wheels 220 are arranged at two sides of the chassis 210. The chassis 210 is configured to bear a load, and the unit controller 250 is configured to obtain posture information of the load detected by the sensor 290 and control independent rotation of the two driving wheels 220 when the power wheel unit 200 operates as the self-balancing scooter. With this arrangement, when the electric scooter S needs to be turned, rotation speeds of the two driving wheels 220 are different, so that the steering of the power wheel unit 200 can be realized. Moreover, the steering of the whole electric scooter S can be realized through the power wheel steering unit 400 and the driven wheel steering unit 500. Since two driving wheels 220 are arranged, the driving stability of the electric scooter S can be improved.

According to another embodiment of the present disclosure, the power wheel unit 200 is the self-balancing scooter, the power wheel unit 200 further includes the chassis 210 and the sensor 290, one driving wheel 220 is provided, and the driving wheel 220 is pivotally coupled to the chassis 210. The chassis 210 is configured to bear the load, and the unit controller 250 is configured to obtain the posture information of the load detected by the sensor 290 and control the independent rotation of the driving wheel 220 when the power wheel unit 200 operates as the self-balancing scooter. The user can control the steering of the power wheel unit 200 through his or her own tilt.

According to an embodiment of the present disclosure, the chassis 210 includes a bearing structure and a steering control shaft, the steering control shaft is rotatably arranged on the bearing structure, and the unit controller 250 controls the independent differential rotation of the two driving wheels 220 according to a rotation angle of the steering control shaft detected by the sensor 290. The power wheel unit 200 with this arrangement can smoothly perform a steering operation through the two driving wheels 220, thus improving the driving experience of the user.

In addition, the steering control shaft is located at one side of a width direction of the bearing structure, a first end of the steering control shaft is pivotally coupled to the bearing structure, and a second end of the steering control shaft is configured to be coupled to a control lever. Therefore, when the self-balancing scooter is used alone, the control lever can be arranged at the second end of the steering control shaft by the user, thus facilitating the user to control the self-balancing scooter and further improving the dual-use of the self-balancing scooter.

According to another embodiment of the present disclosure, the chassis 210 includes two bearing structures and a torsion shaft, and the two bearing structures are pivotally coupled through the torsion shaft. The unit controller 250 controls the independent differential rotation of the two driving wheels 220 according to angle information of the torsion shaft detected by the sensor 290, or the unit controller 250 controls the independent differential rotation of the two driving wheels 220 according to information of an inclination angle of the two bearing structures relative to the ground detected by the sensor 290. This type of self-balancing scooter is a hoverboard, and the torsion shaft can allow two bearing structures to pivot relative to each other. The self-balancing scooter with this arrangement has a simple structure and a good dynamic performance.

Figure 2:
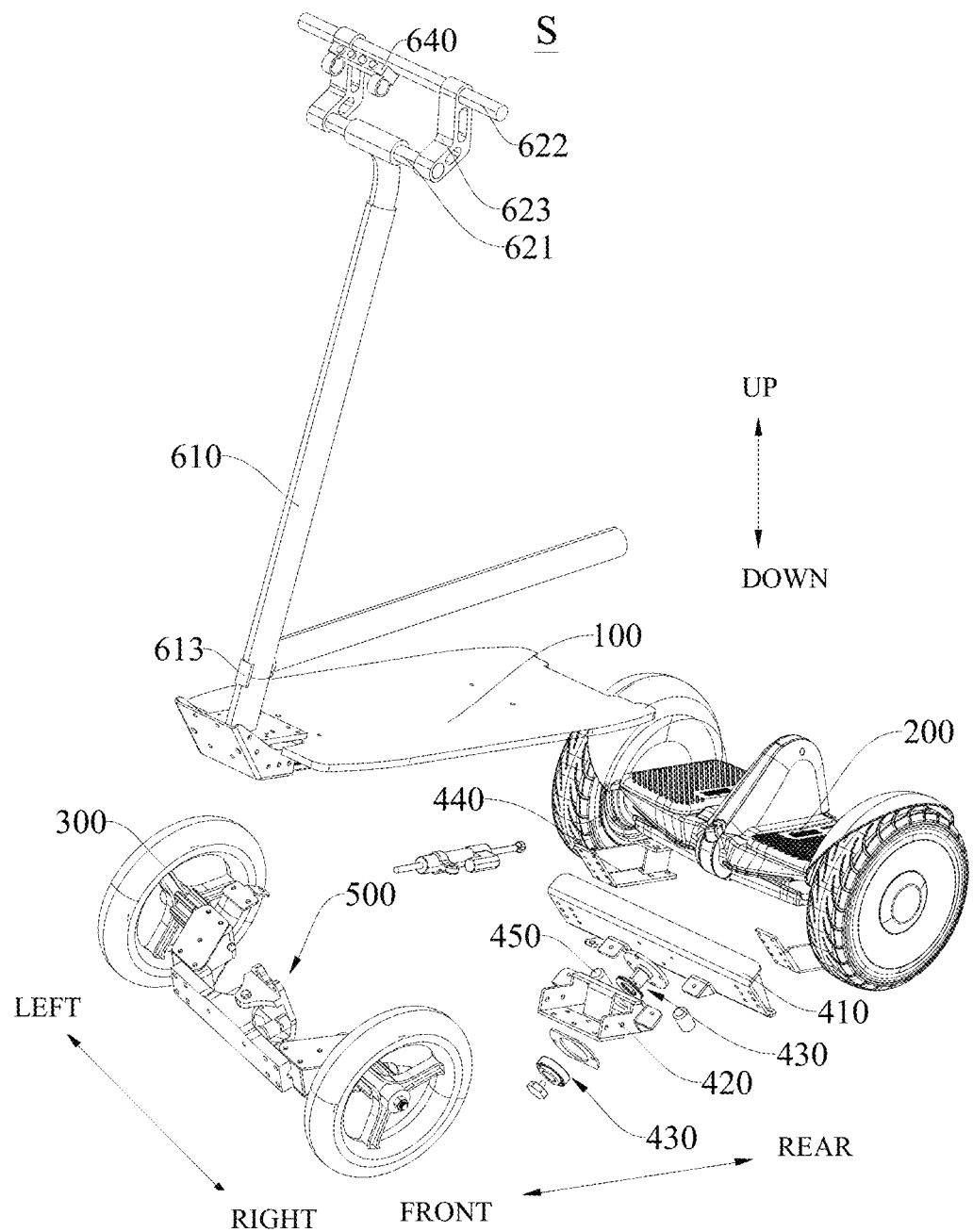
FIG. 2 is an exploded view of an electric scooter according to an embodiment of the present disclosure.
Figure 6:
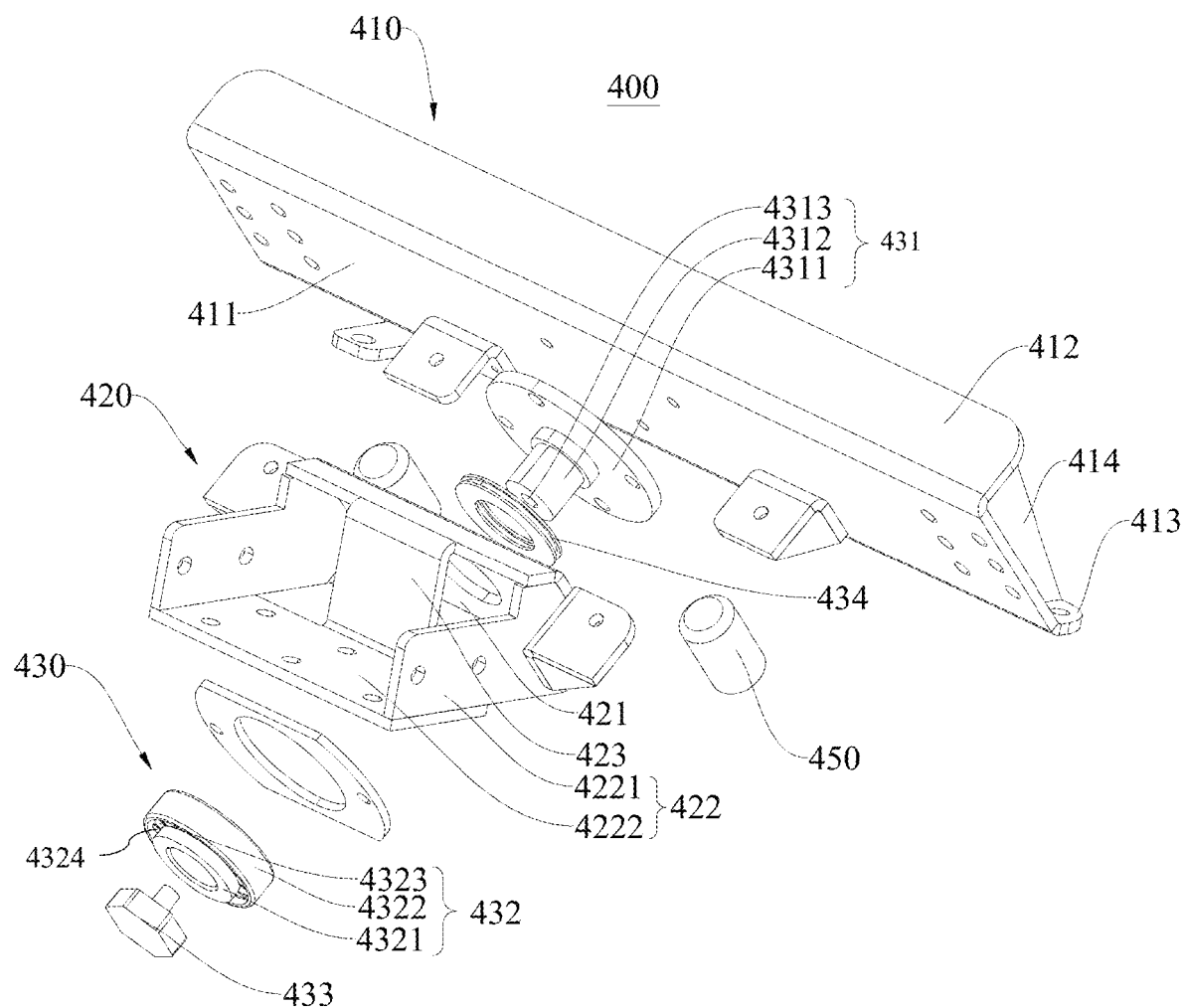
FIG. 6 is schematic view of a power wheel steering unit.

As illustrated in FIGS. 2 and 6, the power wheel steering unit 400 includes: a first steering frame 410, a second steering frame 420 and a first steering assembly 430. The first steering frame 410 is arranged on the power wheel unit 200, the second steering frame 420 is arranged at the first end of the deck 100, and the first steering assembly 430 is arranged between the first steering frame 410 and the second steering frame 420. The first steering assembly 430 allows relative rotation between the first steering frame 410 and the second steering frame 420.

Since the first steering frame 410 is arranged on the power wheel unit 200, the second steering frame 420 is arranged on the first end of the deck 100, and the first steering assembly 430 is arranged between the first steering frame 410 and the second steering frame 420, the first steering frame 410 can be effectively coupled to the second steering frame 420, i.e., the power wheel unit 200 can be coupled to the first end of the deck 100, thus improving the coupling stability of the electric scooter S when used by the user. In addition, the first steering frame 410 and the second steering frame 420 can rotate relative to each other, so that when the electric scooter S operates under an uneven road condition, the deck 100 and the power wheel unit 200 can adapt to the uneven road by rotation between the deck 100 and the power wheel unit 200, to avoid the damage to the electric scooter S and the user injury caused by a rigid coupling between the deck 100 and the power wheel unit 200.

As illustrated in FIG. 6, the first steering assembly 430 includes: a first steering shaft 431 and a steering bearing 432. The first steering shaft 431 is arranged on the first steering frame 410. Through the steering bearing 432, a sliding friction between the first steering shaft 431 and other components of the first steering assembly 430 when running can be changed into a rolling friction, so that the friction loss of the first steering assembly 430 can be reduced.

As illustrated in FIG. 6, the steering bearing 432 includes: an inner ring 4321, an outer ring 4322, a holding frame and a rolling member 4323. The rolling member 4323 is arranged in the holding frame, the holding frame is arranged between the inner ring 4321 and the outer ring 4322. The first steering shaft 431 is arranged on the inner ring 4321 and rotates synchronously with the inner ring 4321, the outer ring 4322 is arranged on the second steering frame 420, and the outer ring 4322 is fixed with the second steering frame 420. The inner ring 4321 can be fitted with the first steering shaft 431 and rotate with the first steering shaft 431. The outer ring 4322 is fitted with the second steering frame 420 and can play a supporting role. The rolling member 4323 is evenly distributed between the inner ring 4321 and the outer ring 4322 by means of the holding frame. The inner ring 4321 and the outer ring 4322 can move relative to each other through the rolling member 4323, and a friction force during movement can be reduced. The holding frame can evenly distribute the rolling member 4323, guide the rotation of the rolling member 4323, and can play the role of lubrication. The rolling member 4323 may be a roller or a ball.

Therefore, the power wheel unit 200 is used as a power source, the electric scooter S of present disclosure has the larger wheel diameter and the larger wheel width compared with the traditional electric scooter S, thus improving the trafficability and the site adaptability of the electric scooter S, and enlarging the application range of the electric scooter S. Moreover, since the power wheel steering unit 400 is arranged between the power wheel unit 200 and the deck 100, the electric scooter S can be disassembled, and the electric scooter S can steer freely. In addition, the storage of the electric scooter S is improved, thus facilitating the user to store the electric scooter S after use, and it is convenient for the user to switch between different use modes.

According to an embodiment of the present disclosure, an axis of the first steering shaft 431 extends in a horizontal direction or a vertical direction. Since the first steering shaft 431 is arranged horizontally or vertically, the steering of the electric scooter S can be realized.

According to another embodiment of the present disclosure, there is an angle between the axis of the first steering shaft 431 and a horizontal plane. Since there is the angle between the first steering shaft 431 and the horizontal plane, the electric scooter S can be avoided from being configured too large in a front-rear direction, and a size of the electric scooter S in the front-rear direction can be reduced.

In some embodiments, the angle is $\alpha$, and $\alpha$ satisfies a relation: $30°\leq\alpha\leq60°$. When the angle $\alpha$ between the first steering shaft 431 and the horizontal plane satisfies: $\alpha<30°$, a junction between the deck 100 and the power wheel unit 200 will also be configured too large; when the angle $\alpha$ between the first steering shaft 431 and the horizontal plane satisfies: $\alpha>60°$, the steering from the power wheel unit 200 cannot be well transferred to the deck 100, which is easy to cause a steering dead angle and affects the steering of the electric scooter S.

As illustrated in FIG. 6, the first steering assembly 430 further includes: a first limit member 433, the first steering shaft 431 is provided with a limit hole 4313, the first limit member 433 is arranged at a side of the inner ring 4321 away from the first steering frame 410, and the first limit member 433 is fitted in the limit hole 4313. Since the first limit member 433 is fitted in the limit hole 4313, the inner ring 4321 can be fixed on the first steering shaft 431, so that the coupling stability between the inner ring 4321 and the first steering shaft 431 can be improved.

As illustrated in FIG. 6, the first steering shaft 431 includes a first shaft 4312 and a first base 4311, the first shaft 4312 is perpendicular to the first base 4311, and the first base 4311 is arranged on the first steering frame 410. The first shaft 4312 extends into the inner ring 4321, the first shaft 4312 is fixedly coupled to the inner ring 4321, and a pressure needle bearing 434 is arranged between the inner ring 4321 and the first base 4311. Since the pressure needle bearing 434 is arranged between the first base 4311 and the steering bearing 432, the friction between the second steering plate 421 and the first base 4311 can be reduced, thereby reducing the damage to the second steering plate 421 and the first base 4311.

In some embodiments, the inner ring 4321 is fixedly fitted over the first shaft 4312, or an end face of the inner ring 4321 is fixedly coupled to the first shaft 4312. Through the above two coupling modes of the inner ring 4321 and the first shaft 4312, the inner ring 4321 can be coupled to the first shaft 4312, so that the inner ring 4321 can rotate synchronously with the first shaft 4312, and then the steering of the power wheel steering unit 400 can be realized.

In some embodiments, the first base 4311 is detachably arranged on the first steering frame 410, and the first limit member 433 is detachably arranged on the first steering shaft 431. Since the first base 4311 is detachably arranged on the first steering frame 410 and the first limit member 433 is detachably arranged on the first steering shaft 431, the disassembly of the first base 4311 and the first steering frame 410 as well as the disassembly of the bearing can be facilitated, thus facilitating the disassembly, the maintenance or the replacement of the first base 4311 and the steering bearing 432 when used by the user.

As illustrated in FIGS. 2 and 5, the power wheel steering unit 400 further includes: a first mounting frame 440 arranged between the first steering frame 410 and the power wheel unit 200. The power wheel unit 200 can be coupled to the first steering frame 410 through the first mounting frame 440, so that the user can disassemble or assemble the electric scooter S.

In some embodiments, two first mounting frames 440 are provided, the two first mounting frames 440 are spaced apart, and the two first mounting frames 440 are both coupled to the bottom of the chassis 210. Since the two first mounting frames 440 are arranged on the chassis 210, the coupling stability between the chassis body and the first coupling frame can be improved, i.e., the coupling stability between the power wheel unit 200 and the power wheel steering unit 400 can be improved.

In an embodiment, the first mounting frame 440 is detachable relative to at least one of the chassis 210 and the first steering frame 410. Since the first mounting frame 440 is detachably coupled to at least one of the chassis 210 and the first steering frame 410, the mounting and the disassembly between the power wheel steering unit 400 and the power wheel unit 200 when used by the user can be facilitated.

As illustrated in FIG. 5, the bottom of the chassis 210 is provided with a flat mounting region. The first mounting frame 440 includes: a first mounting plate 441, a first coupling plate 442 and a second mounting plate 443. The first coupling plate 442 is coupled between the first mounting plate 441 and the second mounting plate 443, the first mounting plate 441 is fixedly coupled to the flat mounting region, the second mounting plate 443 is fixedly coupled to the first steering frame 410, and the second mounting plate 443 is arranged obliquely. Thus, by providing the first mounting plate 441, the first coupling plate 442 and the second mounting plate 443, the power wheel unit 200 can be coupled to the power wheel steering unit 400, so that the deck 100 can be combined with the power wheel unit 200 to form the electric scooter S.

As illustrated in FIG. 5, the first mounting frame 440 further includes a second coupling plate 444 and a third coupling plate 445. The second coupling plate 444 is coupled between the first coupling plate 442 and the second mounting plate 443, and the second coupling plate 444 is arranged opposite to the first mounting plate 441 in an up-down direction; the third coupling plate 445 is coupled between the first mounting plate 441 and the second coupling plate 444, and the third coupling plate 445 is arranged perpendicular to them. Since the second coupling plate 444 and the third coupling plate 445 are arranged, the coupling strength between the first mounting plate 441 and the second mounting plate 443 can be improved, so that the fracture of the first mounting frame 440 during use can be avoided.

In some embodiments, the first mounting plate 441 is detachably mounted at the bottom of the chassis 210, and the second mounting plate 443 is detachably mounted at the first steering frame 410. The first mounting frame 440 with this arrangement can further facilitate the mounting and the disassembly of the power wheel unit 200, and can further benefit the reasonable travel of the user.

Referring to FIGS. 5 and 6, the first steering frame 410 includes: a first steering plate 411, a first steering assembly 430 is arranged on the first steering plate 411, and the first steering plate 411 is arranged obliquely. The first steering plate 411 is parallel to the second mounting plate 443, and the first steering plate 411 is fixedly coupled to the second mounting plate 443. Therefore, the first mounting frame 440 can be coupled to the first steering frame 410 through this arrangement, so that the deck 100 can be coupled to the power wheel unit 200.

Referring to FIG. 6, the first steering frame 410 further includes: a first flanging plate 412 and a second flanging plate 413 arranged at two opposite sides of the first steering plate 411 respectively. Since the first flanging plate 412 and the second flanging plate 413 are arranged, the structural strength of the first steering plate 411 can be improved, and the first flanging plate 412 can cover a junction between the deck 100 and the power wheel unit 200. The second flanging plate 413 can be overlapped on the second coupling plate 444.

As illustrated in FIG. 6, the first steering frame 410 further includes: a first reinforcing plate 414. The first reinforcing plate 414 is coupled on the first steering plate 411, and also coupled between the first flanging plate 412 and the second flanging plate 413. Since the first reinforcing plate 414 is arranged on the first steering frame 410, the structural strength of the first steering frame 410 can be improved, the structural strength of the power wheel steering unit 400 can be further guaranteed, and the travel safety of the user can be improved.

As illustrated in FIGS. 2 and 6, the second steering frame 420 includes: a second steering plate 421 and a first fixing frame 422, and the second steering plate 421 is arranged parallel to the first steering plate 411. Moreover, the second steering plate 421 is provided with a through hole corresponding to the steering bearing 432, and the outer ring 4322 of the steering bearing 432 can be snapped in the through hole. The first fixing frame 422 is coupled to the second steering plate 421 and arranged at the bottom of the first end of the deck 100. It can be understood that the bottom of the deck 100 can be arranged on the first fixing frame 422.

As illustrated in FIGS. 1 and 6, the first fixing frame 422 includes: two first fixing plates 4221 and a second fixing plate 4222, first ends of the first fixing plates 4221 are respectively coupled to two sides of the second steering plate 421, the second fixing plate 4222 is coupled to second ends of the two first fixing plates 4221, and the two first fixing plates 4221 and the second fixing plate 4222 are all arranged at the bottom of the first end of the deck 100. Moreover, the bottom of the deck 100 is provided with a projecting block 130 protruding downward, the two first fixing plates 4221 are arranged at two sides of the projecting block 130, and the second fixing plate 4222 is arranged at the bottom of the projecting block 130. Since the two first fixing plates 4221 and the second fixing plate 4222 are arranged, a mounting groove can be formed, and the projecting block 130 on the deck 100 can be arranged in the mounting groove. Moreover, the two first fixing plates 4221 are fixedly coupled to the two sides of the projecting block 130 respectively, and the second fixing plate 4222 is fixedly coupled to the bottom of the projecting block 130, so that the deck 100 can be fixed on the second steering frame 420, and then a coupling between the deck 100 and the power wheel steering unit 400 can be realized.

As illustrated in FIG. 1, the two first fixing plates 4221 and the second fixing plate 4222 are all detachably arranged on the projecting block 130. Since the projecting block 130 is detachably arranged on the two first fixing plates 4221 and the second fixing plate 4222, a detachable coupling between the deck 100 and the power wheel steering unit 400 can be realized, facilitating the user to disassemble and assemble the deck 100.

As illustrated in FIG. 6, the second steering frame 420 further includes: a fourth coupling plate 423 coupled between the second steering plate 421 and the second fixing plate 4222. Since the fourth coupling plate 423 is arranged between the second steering plate 421 and the second fixing plate 4222, the structural strength of the second steering plate 421 can be improved, thus avoiding the fracture of the second steering frame 420 caused by an excessive stress applied to the first fixing frame 422 during usage by the user.

Figure 3:
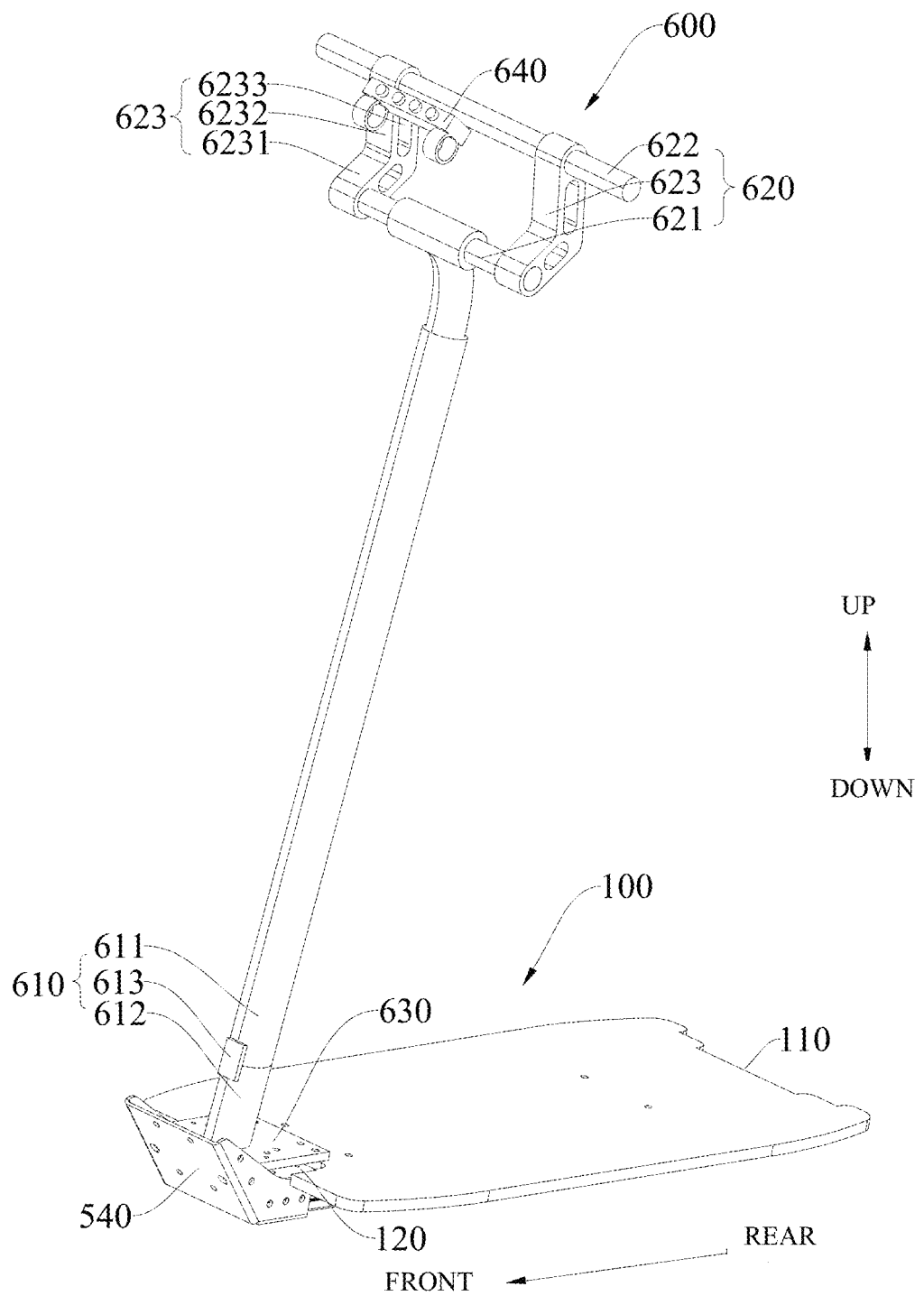
FIG. 3 is a schematic view of a coupling structure between a handlebar assembly and a deck.

As illustrated in FIG. 3, the first end of the deck 100 is provided with a first avoidance groove 110, the fourth coupling plate 423 is arranged in the first avoidance groove 110, and the fourth coupling plate 423 abuts a bottom of the first avoidance groove 110 and an end of the projecting block 130. Since the first avoidance groove 110 is arranged in the deck 100, the fourth coupling plate 423 can be accommodated in the first avoidance groove 110, so that the integrity of the electric scooter S is improved and a size of the deck 100 is reduced, thus realizing the miniaturization design goal of the electric scooter S.

As illustrated in FIG. 6, the power wheel unit 200 further includes: a first buffer 450 arranged between the first steering frame 410 and the second steering frame 420. Since the first buffer 450 is arranged between the first steering frame 410 and the second steering frame 420, an impact force transferred from an uneven road surface to the deck 100 can be buffered and a resulting vibration can be attenuated to ensure that the electric scooter S can travel smoothly. In addition, the first buffer 450 can help the deck 100 return to a normal position and keep balance when the deck 100 is tilted, so that the user can better operate the electric scooter S.

In some embodiments, two first buffers 450 are provided, and the two first buffers 450 are respectively arranged at two opposite sides of the steering bearing 432. Since the two first buffers 450 are arranged at the two opposite sides of the steering bearing 432, the impact force transferred from the uneven road surface to the deck 100 can be buffered by two sides of the deck 100, so that the movement of the electric scooter S is more stable.

As illustrated in FIG. 1, the electric scooter S further includes: a first damping device 700 arranged between the deck 100 and the first steering frame 410, or between the deck 100 and the power wheel unit 200. Since the first damping device 700 is arranged, the first damping device 700 can be combined with the first buffer 450 to reduce vibration and energy at a junction between the deck 100 and the power wheel unit 200, preventing the electric scooter S from swinging at a high speed, so that the movement of the electric scooter S is more stable.

As illustrated in FIG. 2, the driven wheel steering unit 500 is arranged between the driven wheel 300 and the second end of the deck 100, and the driven wheel steering unit 500 is detachable relative to the driven wheel 300 and the second end of the deck 100. Since the driven wheel steering unit 500 is arranged between the driven wheel 300 and the second end of the deck 100, the steering of the electric scooter S is controlled by a combination of the driven wheel steering unit 500 and the power wheel steering unit 400. Additionally, since the driven wheel steering unit 500 is detachably arranged on the driven wheel 300 and the second end of the deck 100, the disassembly and the assembly of the electric scooter S by the user are convenient.

Figure 4:
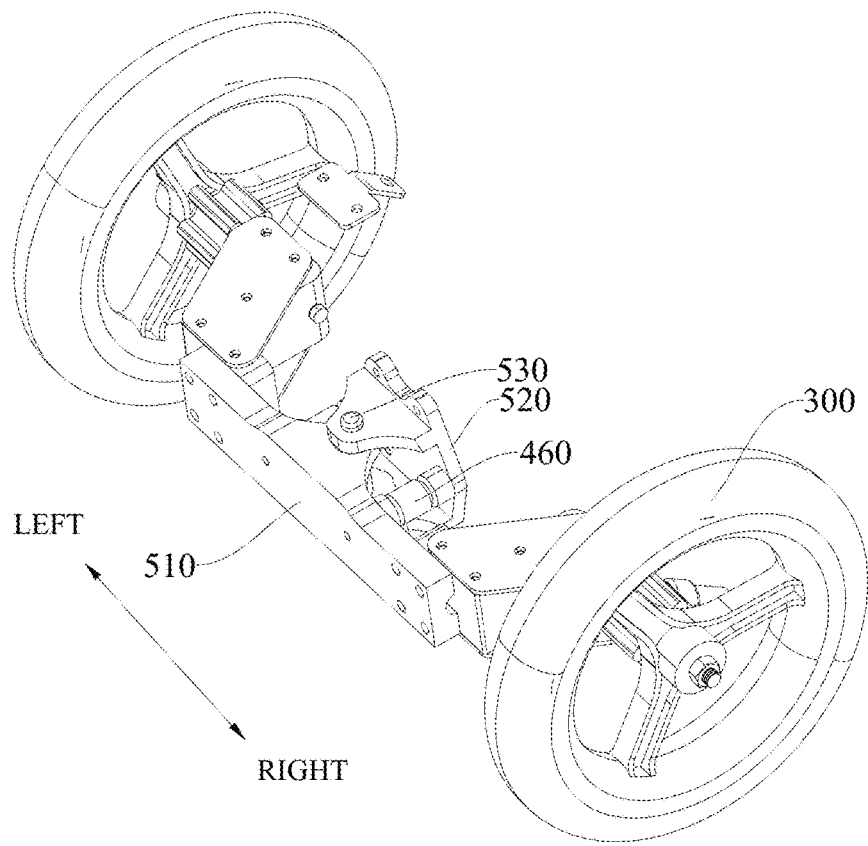
FIG. 4 is a schematic view of a coupling structure between a driven wheel steering unit and a driven wheel.

As illustrated in FIG. 4, the driven wheel steering unit 500 includes: a third steering frame 510, a fourth steering frame 520 and a second steering shaft 530. The driven wheel 300 is arranged on the third steering frame 510, the fourth steering frame 520 is arranged on the second end of the deck 100, and the second steering shaft 530 is arranged between the third steering frame 510 and the fourth steering frame 520. Since the third steering frame 510 is arranged on the driven wheel 300, the fourth steering frame 520 is arranged at the second end of the deck 100, and the second steering shaft 530 is arranged between the third steering frame 510 and the fourth steering frame 520, and also located between two driven wheels 300, the third steering frame 510 and the fourth steering frame 520 are coupled together, i.e., the driven wheel 300 and the second end of the deck 100 are coupled together, so that the coupling stability of the electric scooter S is improved when used by the user.

As illustrated in FIG. 3, a second mounting frame 540 is arranged between the fourth steering frame 520 and the second end of the deck 100. Since the second mounting frame 540 is arranged on the deck 100, the fourth steering frame 520 and the deck 100 can be coupled together, i.e., the driven wheel steering unit 500 and the deck 100 can be coupled together.

As illustrated in FIGS. 1 and 3, the projecting block 130 protruding downward is arranged at the bottom of the deck 100, a mounting groove is defined in the second mounting frame 540, and the projecting block 130 on the deck 100 can be arranged in the mounting groove. Moreover, two opposite sides of the second mounting frame 540 are fixedly coupled to the two sides of the projecting block 130, and the bottom of the second mounting frame 540 is fixedly coupled to the bottom of the projecting block 130. Therefore, the deck 100 can be fixed on the second mounting frame 540, and then a coupling between the deck 100 and the driven wheel steering unit 500 can be realized.

As illustrated in FIG. 4, the driven wheel steering unit 500 further includes: a second buffer 460 arranged between the third steering frame 510 and the fourth steering frame 520. Since the second buffer 460 is arranged between the third steering frame 510 and the fourth steering frame 520, an impact force transferred from the uneven road surface to the deck 100 can be buffered and a resulting vibration can be attenuated, to ensure that the electric scooter S can travel smoothly. In addition, the second buffer 460 can help the deck 100 return to a normal position and keep balance when the deck 100 is tilted, so that the user can better operate the electric scooter S.

In some embodiments, two second buffers 460 are provided, and the two second buffers 460 are respectively arranged at two opposite sides of the second steering shaft 530. Since the two second buffers 460 are arranged at the two opposite sides of the second steering shaft 530, the impact force transferred from the uneven road surface to the deck 100 can be buffered by the two sides of the deck 100, so that the movement of the electric scooter S is more stable.

As illustrated in FIG. 1, the electric scooter S further includes: a second damping device 800 arranged between the deck 100 and the third steering frame 510, or between the deck 100 and the driven wheel 300. Since the second damping device 800 is arranged, the second damping device 800 can be combined with the second buffer 460 to reduce vibration and energy at a junction between the driven wheel 300 and the deck 100, thus preventing the electric scooter S from swinging at a high speed, so that the movement of the electric scooter S is more stable.

As illustrated in FIG. 2, the electric scooter S further includes: a handlebar assembly 600 and the whole scooter controller 640. The handlebar assembly 600 includes: a pole 610 and a handle 620. The pole 610 is arranged on the deck 100 and the handle 620 is arranged on the pole 610. Since the handlebar assembly 600 is arranged on the deck 100, the safety of the electric scooter S can be improved, and the operation difficulty of the electric scooter S is reduced simultaneously, so that the electric scooter S can be suitable for the users of different ages. The whole scooter controller 640 is arranged on the handle 620, and the whole scooter controller 640 is coupled to the power wheel unit 200 in a wired or wireless manner. The whole scooter controller 640 can control the power wheel unit 200 to adjust motion parameters of the electric scooter S, and then control the movement of the electric scooter S.

Therefore, the handlebar assembly 600 and the whole scooter controller 640 are arranged on the electric scooter S, and the handlebar assembly 600 and the whole scooter controller 640 facilitate the control of the electric scooter S.

The whole scooter controller 640 and the power wheel unit 200 are both provided with a wireless connector. The wireless connector of the whole scooter controller 640 is coupled to the wireless connector of the power wheel unit 200, so that the user can control the vehicle to move forward or steer through the whole scooter controller 640 on the handlebar assembly 600. Moreover, the wireless connector can facilitate the disassembly and the assembly by the user, i.e., the user does not need to disassemble and assemble coupling line between the whole scooter controller 640 and the power wheel unit 200 during disassembly and assembly, thus facilitating the use of the user. In addition, the communication stability and flexibility between the whole scooter controller 640 and the power wheel unit 200 can be improved.

In some embodiments, the handlebar assembly 600 is detachably arranged on the deck 100. Since the handlebar assembly 600 is detachably arranged on the deck 100, the storage and the portability of the product can be improved. Moreover, the electric scooter S can be switched between two modes, i.e., the electric scooter S with or without the handlebar assembly 600 by disassembling or mounting the handlebar assembly 600, thus meeting the different needs of the users with different technical levels.

As illustrated in FIG. 3, the handlebar assembly 600 includes a second base 630. The pole 610 is arranged on the second base 630, and the second base 630 is detachably arranged on the deck 100. Therefore, the handlebar assembly 600 can be detachably fixed on the deck 100. The electric scooter S can have two operation modes by disassembling or mounting the handlebar assembly 600, thus meeting the different needs of the users with different technical levels.

Referring to FIG. 3, a second avoidance groove 120 is defined in an upper surface of the second end of the deck 100, and the second base 630 is arranged in the second avoidance groove 120. Since the second avoidance groove 120 is arranged in the deck 100 and the second base 630 is arranged in the second groove, the coupling strength between the base and the deck 100 can be improved, and the integrity of the electric scooter S is better.

As illustrated in FIG. 3, the pole 610 includes: a first pole segment 611, a second pole segment 612 and a second limit member 613. The handle 620 is arranged at an upper end of the first pole segment 611, the second pole segment 612 is arranged at a lower end of the first pole segment 611 and on the second base 630, and the first pole segment 611 is rotatable relative to the second pole segment 612. The second limit member 613 is arranged at a junction between the first pole segment 611 and the second pole segment 612, to keep the first pole segment 611 in a vertical position relative to the second pole segment 612.

In addition, the deck 100 is provided with a storage cavity, and the second pole segment 612 is hidden in the storage cavity after rotating a predetermined angle relative to the first pole segment 611. That is, when the user does not need the handlebar assembly 600, the first pole segment 611 and the second pole segment 612 of the handlebar assembly 600 can be folded and stored in the storage cavity, thus improving the convenience when used by the user and avoiding disassembly of the handlebar assembly 600 by the user.

In some embodiments, when the user needs to fold the handlebar assembly 600, the second limit member 613 can be opened to fold the first pole segment 611 and the second pole segment 612, so that the space occupied by the electric scooter S can be reduced and it is convenient to carry the electric scooter S. When the user needs to use the electric scooter S, the first pole segment 611 and the second pole segment 612 can be unfolded, and then the first pole segment 611 and the second pole segment 612 can be fixed together through the second limit member 613 to keep the first pole segment 611 in the vertical position relative to the second pole segment 612, so that the user can hold the hand lever 600, thus improving the driving safety.

As illustrated in FIGS. 3 and 7, the whole scooter controller 640 is detachably arranged on the handle 620. Since the whole scooter controller 640 is detachably arranged on the handle 620, the whole scooter controller 640 can not only be mounted on the handle 620, but also can be held by the user in his hand. Since the whole scooter controller 640 is mounted on the handle 620, the whole scooter controller 640 can be allowed to be coupled more stable. Since the user holds the whole scooter controller 640 in his hand, the electric scooter S can be controlled more conveniently. Two use modes of the whole scooter controller 640 can provide the user with more choices.

As illustrated in FIG. 3, the handle 620 includes: a first handlebar 621, a second handlebar 622 and a coupling lever 623. The coupling lever 623 is coupled between the first handlebar 621 and the second handlebar 622, and the first handlebar 621 is arranged on the pole 610. Since the first handlebar 621 and the second handlebar 622 are arranged, the user can chose different grab positions when driving for a long time, so that the user will not be tired due to maintaining one posture with his hand for a long time. The whole scooter controller 640 is arranged on the second handlebar 622.

As illustrated in FIG. 2, a length of the first handlebar 621 is less than a length of the second handlebar 622, two coupling levers 623 are provided and coupled at two ends of the handlebars, and two ends of the second handlebar 622 extend outward beyond the two coupling levers 623 to form two side grab portion. Therefore, the length of the first handlebar 621 is less than the length of the second handlebar 622, to form the two side grab portions at the two ends of the second handlebar 622, so that the user is more comfortable during use. Moreover, the two coupling levers 623 are arranged between the first handlebar 621 and the second handlebar 622, so that the coupling strength between the first handlebar 621 and the second handlebar 622 is improved. In addition, the whole scooter controller 640 is arranged at a portion of the second handlebar 622 located between the two coupling levers 623.

As illustrated in FIG. 3, the coupling lever 623 includes: a first bending portion 6231 and a second bending portion 6232. The first bending portion 6231 and the second bending portion 6232 are bent, the first bending portion 6231 is coupled to the first handlebar 621, and the second bending portion 6232 is coupled to the second handlebar 622. Therefore, the first handlebar 621 and the second handlebar 622 are coupled through the first bending portion 6231 and the second bending portion 6232, and the bent coupling lever 623 can allow the handle 620 to be more suitable for a use posture of the user, thus improving the user experience.

As illustrated in FIG. 3, the first bending portion 6231 and the second bending portion 6232 are each provided with a weight reducing hole 6233. Since the weight reducing hole is arranged on the first bending portion 6231 and the second bending portion 6232, the weight of the electric scooter S can be reduced, so that the electric scooter S can be designed with a light weight.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "axial," "radial" and "circumferential" should be construed to refer to the orientation as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure. In the description of the present disclosure, "a plurality of" means two or at least two. In the description of the present disclosure, a structure in which a first feature is "on" or "below" a second feature may include an embodiment in which the first feature is in direct contact with the second feature, and may further include an embodiment in which the first feature and the second feature are not in direct contact with each other, but are contacted via an additional feature formed therebetween.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the exemplary descriptions of the above terms throughout this specification are not necessarily referring to the same embodiment or example.

Although embodiments of the present disclosure have been shown and described, it would be appreciated by those skilled in the art that various changes, modifications, alternatives and variations may be made in the embodiments without departing from principles and purposes of the present disclosure. The scope of the present disclosure is defined by the claims and their equivalents.

What is claimed is:

1. An electric scooter, comprising:
    a deck;
    a power wheel unit comprising a driving wheel;
    a power wheel steering unit arranged between the deck and the power wheel unit;
    a driven wheel spaced apart from the power wheel unit;
    a driven wheel steering unit arranged between the driven wheel and the deck;
    a power supply unit electrically coupled to the power wheel unit; and
    a whole scooter controller in communication with the power wheel unit and configured to control rotation of the driving wheel,
    wherein the power wheel unit is detachably coupled to the power wheel steering unit.

2. The electric scooter according to claim 1, wherein the power supply unit is arranged in the power wheel unit.

3. The electric scooter according to claim 2, wherein the driving wheel comprises a wheel body rotatably arranged on the power wheel steering unit and a hub motor arranged in the wheel body and electrically coupled to the power supply unit.

4. The electric scooter according to claim 1, wherein the power wheel unit comprises a unit controller, the whole scooter controller is in communication with the unit controller when the power wheel unit is mounted on the power wheel steering unit, and the unit controller is configured to obtain operation information transmitted from the whole scooter controller to control rotation of the power wheel.

5. The electric scooter according to claim 4, wherein the power wheel unit is a self-balancing scooter and further comprises a chassis and a sensor, wherein two driving wheels are provided and arranged at two sides of the chassis, the chassis is configured to bear a load, and the unit controller is configured to obtain posture information of the load detected by the sensor and control independent rotation of the two driving wheels when the power wheel unit operates as the self-balancing scooter.

6. The electric scooter according to claim 4, wherein the power wheel unit is a self-balancing scooter and further comprises a chassis and a sensor, wherein one driving wheel is provided and pivotally coupled to the chassis, the chassis is configured to bear a load, and the unit controller is configured to obtain posture information of the load detected by the sensor and control independent rotation of the driving wheel when the power wheel unit operates as the self-balancing scooter.

7. The electric scooter according to claim 1, wherein the power wheel steering unit comprises:
    a first steering frame arranged on the power wheel unit;
    a second steering frame arranged at a first end of the deck; and
    a first steering assembly arranged between the first steering frame and the second steering frame and configured to allow relative rotation between the first steering frame and the second steering frame.

8. The electric scooter according to claim 7, wherein the first steering assembly comprises:
    a first steering shaft arranged on the first steering frame and arranged obliquely relative to the deck; and
    a steering bearing comprising an inner ring, an outer ring, a holding frame arranged between the inner ring and the outer ring and a rolling member arranged in the holding frame, the first steering shaft being fixedly coupled to the inner ring, and the outer ring being arranged on the second steering frame and fixed with the second steering frame.

9. The electric scooter according to claim 8, wherein an angle between an axis of the first steering shaft and a horizontal plane is greater than or equal to 30 degrees and less than or equal to 60 degrees.

10. The electric scooter according to claim 8, wherein the first steering assembly further comprises a first limit member, the first steering shaft is provided with a limit hole, the first limit member is arranged at a side of the inner ring away from the first steering frame, and the first limit member is fitted in the limit hole.

11. The electric scooter according to claim 8, wherein the first steering shaft comprises a first base arranged on the first steering frame, and a first shaft perpendicular to the first base.

12. The electric scooter according to claim 8, wherein the power wheel steering unit further comprises a first mounting frame arranged between the first steering frame and the power wheel unit.

13. The electric scooter according to claim 12, wherein the first mounting frame comprises a first mounting plate fixedly coupled to a bottom of a chassis of the power wheel unit, a second mounting plate fixedly coupled to the first steering frame, and a first coupling plate coupled between the first mounting plate and the second mounting plate, and the second mounting plate is arranged obliquely.

14. The electric scooter according to claim 13, wherein the first mounting frame further comprises a second coupling plate coupled between the first coupling plate and the second mounting plate and arranged opposite to the first mounting plate in an up-down direction, and a third coupling plate coupled between and perpendicular to the first mounting plate and the second coupling plate.

15. The electric scooter according to claim 7, wherein the power wheel steering unit further comprises: a first buffer arranged between the first steering frame and the second steering frame.

16. The electric scooter according to claim 7, further comprising a first damping device arranged between the deck and the first steering frame.

17. The electric scooter according to claim 1, wherein two driven wheels are provided;
the driven wheel steering unit comprises:
a third steering frame, the two driven wheels being arranged at two sides of the third steering frame respectively;
a fourth steering frame arranged at a second end of the deck; and
a second steering shaft passing through the third steering frame and the fourth steering frame and arranged obliquely relative to the deck.

18. The electric scooter according to claim 17, wherein the driven wheel steering unit further comprises a second buffer arranged between the third steering frame and the fourth steering frame.

19. The electric scooter according to claim 18, further comprising: a second damping device arranged between the deck and the third steering frame.

20. The electric scooter according to claim 18, further comprising: a second damping device arranged between the deck and the driven wheels.

* * * * *